Patented Feb. 20, 1923.

1,446,307

UNITED STATES PATENT OFFICE.

BERTRAM HUNT, OF LONDON, ENGLAND.

PROCESS FOR THE RECOVERY OF SULPHUR, METALLIC SULPHIDES, AND THE LIKE FROM A CONDITION OF EMULSION WITHOUT FILTRATION OR EVAPORATION.

No Drawing.   Application filed June 22, 1922.   Serial No. 570,233.

*To all whom it may concern:*

Be it known that I, BERTRAM HUNT, a British subject, and a resident of London, England, have invented certain new and useful Processes for the Recovery of Sulphur, Metallic Sulphides, and the like from a Condition of Emulsion Without Filtration or Evaporation, of which the following is the specification.

This invention has for its object the recovery of sulphur, metallic sulphides containing free sulphur, and analogous substances in a coherent form, from a condition of emulsion or suspension in an aqueous liquid and their separation from gangues or other earthy matters or the like which have the property of becoming wetted by water, and this without filtration or evaporation of the liquid.

According to the invention, the emulsion of sulphur and gangue or the like, containing finely divided or precipitated sulphur in suspension in an aqueous liquid is heated to a temperature in excess of the melting point of sulphur under pressure in a suitable autoclave or similar vessel. As the melting point of sulphur is about 113° centigrade, it is essential that the sulphur and gangue emulsion should be heated to that temperature or a little higher, but it is not necessary to restrict the temperature to 120° centigrade. If it be desired to expedite the melting of the sulphur, the emulsion may be heated under pressure to a temperature not exceeding 165° centigrade, the pressure of course, in each case, being at least that corresponding to the temperature.

It is known that under these conditions sulphur will melt and may be discharged from the autoclave as a liquid, in any convenient manner, but it has been found that in the presence of gangue, earthy matters, or the like, which become wetted by the water present, the sulphur has the further property when, under the conditions set forth, it is melted, of rejecting the gangue or earthy matter which remains in suspension in the aqueous liquid. In order to keep the gangue in suspension in the aqueous liquid, the contents of the vessel are agitated by any convenient means.

Sulphur, as recovered in the form of an emulsion or suspension in water from the treatment of gases, resulting from metallurgical operations and the like, is invariably contaminated with a proportion of finely divided mineral matter or "fluedust."

When melted under the conditions set forth, the sulphur can be withdrawn in a pure condition from the autoclave, and the mineral matter or "fluedust" remains in suspension in the aqueous liquid.

Certain metallic sulphides resulting from hydro-metallurgical operations and containing free sulphur, or to which a sufficiency of sulphur has been added, will enter into or coalesce with the sulphur when the sulphur is melted under the conditions stated, while any gangue or the like present will remain in suspension in the aqueous liquid.

What I claim is:—

Process for the recovery of metallic sulphides with sulphur or to which free sulphur has been added from aqueous emulsions and their separation from gangue or the like wetted by water and also contained in the emulsion, consisting in heating the emulsion to a temperature of or in excess of the melting point of sulphur, under a corresponding pressure in known apparatus, the emulsion being maintained in a state of agitation and the coalesced metallic sulphides and sulphur being withdrawn, as set forth.

In testimony whereof I have signed my name to this specification.

BERTRAM HUNT.